June 16, 1942.   D. O. DOLLNIG   2,286,200
ENDLESS FILM REELING DEVICE FOR MOTION PICTURE PROJECTORS
Filed Nov. 30, 1939   2 Sheets-Sheet 2
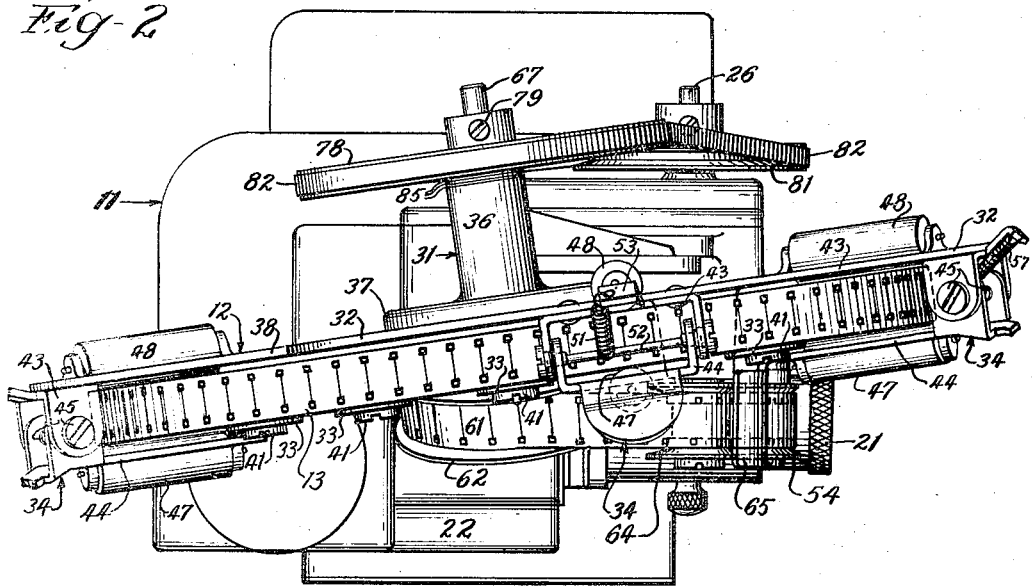
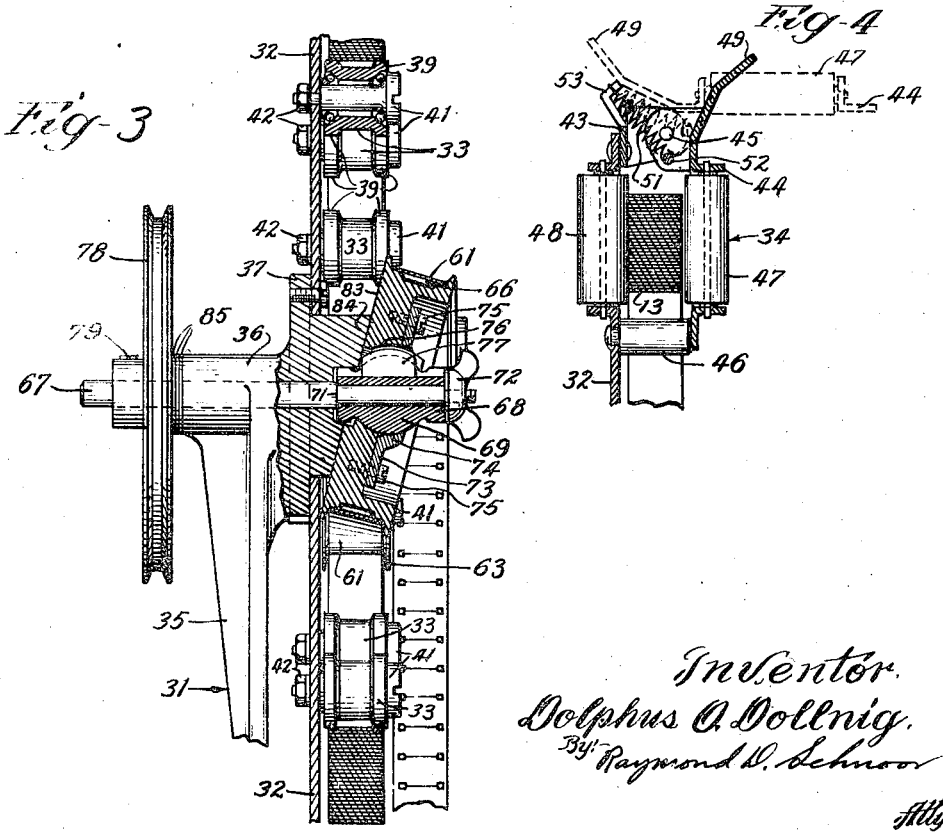
Inventor
Dolphus O. Dollnig.
By Raymond D. Schnoor
Atty.

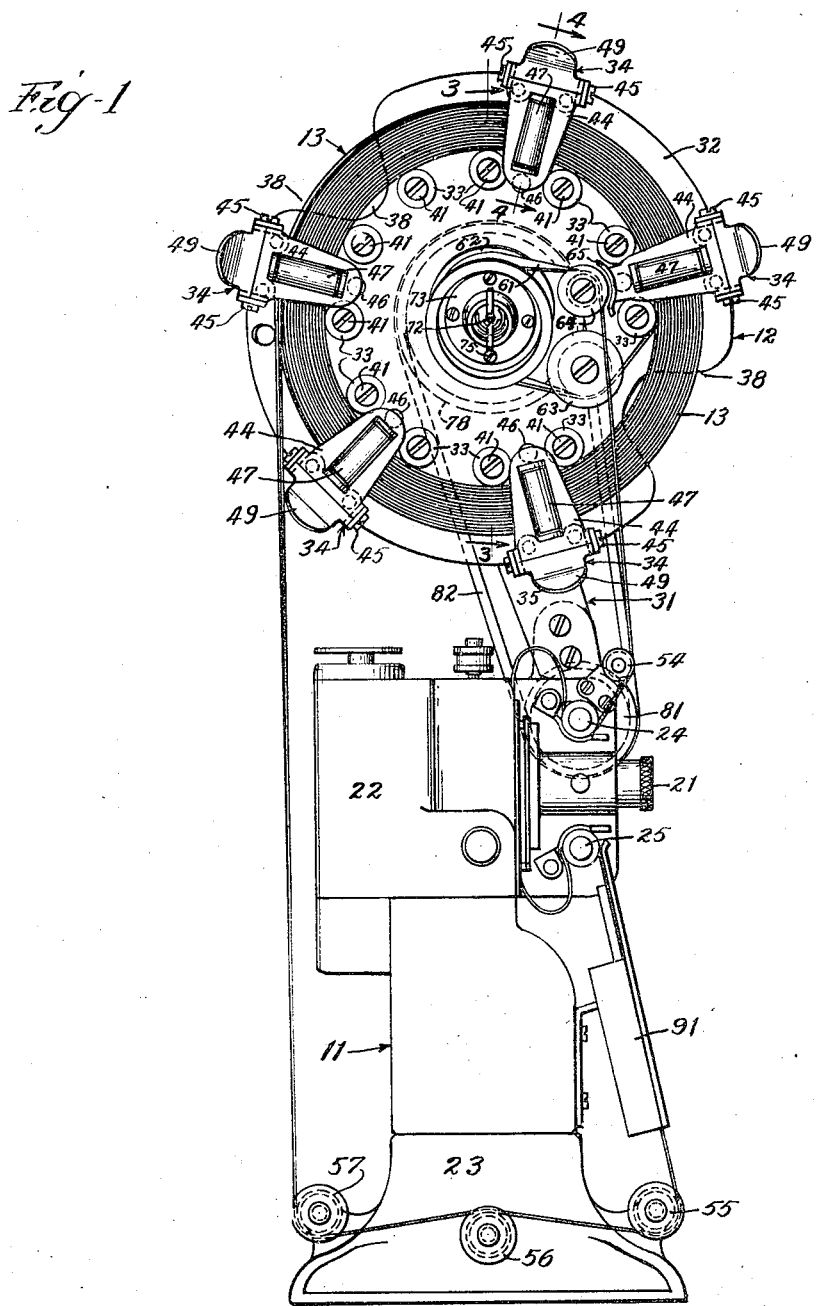

Patented June 16, 1942

2,286,200

UNITED STATES PATENT OFFICE 2,286,200

ENDLESS FILM REELING DEVICE FOR MOTION PICTURE PROJECTORS

Dolphus O. Dollnig, River Forest, Ill., assignor to Mills Novelty Company, Chicago, Ill., a corporation of Illinois Application November 30, 1939, Serial No. 306,827

13 Claims. (Cl. 88—18.7)

This invention relates in general to a motion picture projector and more particularly to such a device which is particularly adapted for projecting pictures from endless or continuous films.

An important object of the invention is to provide such a device in which the film is confined to travel substantially in a single plane during projection and except while wound up in a coil or while passing from the coil so that the normal tendency toward film breakage is reduced to a minimum.

Another important object of the invention is to provide such a device which is constructed and arranged so that endless film rolls or coils may be interchanged thereon or substitute coils may be mounted thereon from time to time in accordance with requirements and without the usual film cutting and splicing operations.

A further important object of the invention is to provide a film feed means in connection with a film carrier which is arranged to feed film toward the projector from the innermost convolution of a film coil and subject to tension applied to the film by the projector.

Other objects of the invention such as the economy of construction and efficiency of operation will be apparent from the following description, which, taken in connection with the accompanying drawings, discloses a preferred embodiment thereof.

Referring to the drawings:

Figure 1 is an elevational view of a motion picture projecting device embodying the invention.

Fig. 2 is an enlarged plan view of the device shown in Fig. 1, and illustrating details of construction thereof.

Fig. 3 is an enlarged transverse vertical section taken substantially on line 3—3 in Fig. 1, further illustrating details of construction; and Fig. 4 is a similarly enlarged sectional view taken substantially on line 4—4 in Fig. 1, and illustrating a form of removable film guide.

To illustrate the invention a projector 11 is shown having a film carrier 12 arranged thereon in superimposed relationship and carrying a coiled motion picture film 13 arranged for projection by the projector 11.

The projector 11 may be of any conventional or suitable commercial type having a projection lens 21, carried by a housing 22 mounted upon a suitable base 23, and associated with suitable film feed or advancing mechanism, such as constant feed sprockets 24 and 25 driven from a power means located within the housing and through suitable transmission and drive devices. The feed sprockets 24 and 25 are arranged on opposite sides of the projection lens 21 and an intermittent feed mechanism (not shown) contained within the housing 22 advances the film across the axis of the projection lens and a suitable aperture coaxially disposed with respect thereto.

A suitable power means (not shown) contained within the housing 22 actuates the intermittent feed mechanism, the sprockets 24 and 25, and a laterally extending drive shaft 26 (Fig. 2) normally provided for driving film reels.

A suitable projection lamp and condenser for cooperation with the projection lens 21 are also contained within the housing 22.

The film carrier 12 includes a support 31, a frame plate 32, a series of anti-friction rollers 33, and a plurality of clamp-like latch devices 34, and means is provided for unwinding the film coil 13 from the inside as will be later described.

The support 31 may be of any suitable device for supporting the carrier either on or adjacent the projector 11 and in the present embodiment a cast metal arm 35 is shown having a bearing portion 36 formed at the upper extremity thereof and secured to the projector 11 by means of screws.

The frame plate 32 may be a metallic disc somewhat larger in diameter than the film coil 13 and centrally apertured for mounting against a flange 37 formed on the bearing portion 36 of the support 31 as shown (Figs. 2 and 3). The periphery of the frame plate 32 may be notched as shown at 38 to facilitate the removal of the film coil 13 by manual engagement.

The anti-friction rollers 33 are metal spools having their periphery centrally relieved to form spaced flanges 39 for engaging edge portions of the film only. These rollers are mounted through bearing balls on shoulder studs 41, which are rigidly secured to the frame plate 32 by means of nuts 42 engaging the threaded ends of the studs 41, and are arranged in a circle and in radially spaced relationship about the center of the plate 32. Together they form an interrupted circular anti-friction holder for supporting the film coil 13 from the inside without materially resisting rotation thereof in operation.

The latch devices 34 each include a bearing bracket 43 and a clamp plate 44 pivotally secured thereto by means of pivot screws 45 having threaded engagement in suitably spaced lugs formed on the bracket 43 and a pivot bearing connection in companion lugs formed on the clamp plate 44. The lugs formed on the bracket 42 and plate 44 are proportioned so that when the plate 44 is parallel to the frame plate 32 a channel is formed between these parts through which the film coil may pass freely when rotating. A suitable stop post 46 may be mounted in the frame plate 32 as shown for limiting the relative movement of the plate 44.

The latch devices are mounted on or secured to the frame plate 32 near the periphery thereof and are radially spaced about the frame plate in suitable positions. The clamp plates 44 thereof extend toward a common center and beyond the film coil to engage the limiting or stop posts 46. Anti-friction rollers 47 are mounted in the plates 44 to rotate on an axis disposed at right angles to the path of movement of the film coil and to lightly engage the edges of the convolutions of film forming the coil so as to register the convolutions.

Similar rollers 48 may be mounted in the frame plate 32 to cooperate with the rollers 47 in forming a channel for the film coil.

In accordance with a feature of this invention the channel formed about the rollers 33 and between the bracket 43 and plate 44 or the rollers carried therein is a closed channel during operation and may be opened to facilitate the substitution of film rolls on the carrier. This opening of the channel is permitted by the pivotal connection between the bracket 43 and the plate 44 and a latch spring 51 is provided to hold the plate 44, either in the closed position shown by solid lines or the open position shown by dotted lines in Fig. 4.

The latch spring 51 is a tension spring one end of which engages a pin 52 extending between the companion lugs formed on the plate 44, and the other end of which engages a stop lug 53 formed on the bracket 43 in position to limit the opening movement of the plate 44. The spring 51 is arranged or located so that in the closed and open positions of the plate 44, it will pull to one side or the other of the axis of the pivot screws 45 as illustrated in Fig. 4 and thereby hold the plate in either position until manually displaced therefrom.

Lips 49 may be formed on the latch plates 44 to facilitate manual operation thereof as above described.

In accordance with another feature of this invention the film is controlled to move in a single plane path during projection and while unwound from the main coil so that extreme twisting of the film is eliminated to reduce the possibility of film breakage during operation. To accomplish this, guide devices such as guide rollers 54, 55, 56 and 57 of the flanged anti-friction type are arranged about the projector as illustrated in Fig. 1, and to guide the film in a plane which is parallel to the path of movement of the film across the axis of the lens and also parallel to the axis of the lens, and the film carrier is arranged to intercept this plane at the film receiving point and to return the film directly to this plane.

It is believed that the most ideal operating position for the carrier is directly above the projector as illustrated and that it may be directly attached to the projector as shown or supported above it in any suitable manner.

The carrier is positioned to hold the film coil at a slight or acute angle to the above-mentioned plane as shown in Fig. 2 and so that film unwound from the innermost convolution of the coil may be delivered directly into that plane as an incident to unwinding as will now be described.

While a coordinated positive film feed mechanism, including a toothed sprocket, for feeding the film from the innermost convolution of the film coil, or other means responsive to rotation of the coil, may be provided, a film feed is illustrated which, in accordance with a feature of this invention, is responsive to the application of tension to the outgoing film, which may be aided by means of a snub-like action between a loop 61 formed in the outgoing film and a power actuated rotating element 62 disposed centrally with respect to the coil 13.

When relatively small film coils are to be used, no power connection need be provided for rotating the element 62.

The rotating element 62 is arranged at an angle to the film coil and to receive the film in a plane normal to that of the film coil 13 or so that a plane cutting the axis of rotation of the element 62 at right angles and bisecting the peripheral surface thereof will intercept a plane parallel to and located substantially midway between the front and back faces of the film coil and to release or discharge the film in the film travel plane above described. The maximum surface engagement between the film loop 61 and the element 62 may be limited by a suitable anti-friction guide roller 63 mounted on the frame plate 32 in position to control the angle of movement of the film toward the element 62 and a similar guide roller 64 mounted away from the face of the plate 32 a distance equal to the lateral displacement of the film by the rotating element 62 and to limit the arc of engagement of the loop 61 therewith.

A suitable film gate 65 may be formed as a portion of one of the plates 44 as shown in Fig. 1 and arranged to prevent displacement of the film from the guide roller 64 during operation.

In the present embodiment the rotating element 62 is formed of a flanged pulley the periphery of which is centrally recessed as at 66 to prevent abrasion of the central portion of the film surface and which is mounted on a driven shaft 67 through a drive joint permitting the pulley to rotate about an axis other than the axis of the shaft 67. This arrangement is provided so that the film of the loop 61 is moved laterally from the plane of the film coil 13 and into the film travel plane above mentioned and as an incident to its travel about the rotating element 62.

The drive joint illustrated is a ball and socket joint formed between a hub 68 having a longitudinally central spherical portion 69 and the pulley 62. The hub 68 is rigidly secured against a shoulder 71 formed on the shaft 67 and to rotate therewith by means of a threaded nut 72 engaging the threaded end of the shaft.

A cover plate 73 having a socket 74 formed therein and secured against the pulley by means of screws 75 cooperates with a companion socket 76 formed in the pulley to form a ball socket and a suitable key 77 interlockingly engaged in the hub 68 and the pulley completes the ball and socket drive connection.

The shaft 67 is driven by a pulley 78 secured thereto by means of a set screw 79 or the like, and from a pulley 81, carried by the drive shaft 26 of the projector, through a belt 82 engaged with the pulleys 78 and 81.

The shaft 67 is proportioned so that when the pulley 78 is secured thereto an inner face 83 of the pulley 62 will be held to rotate against an angularly faced extended portion 84 of the bearing 36, forcing the pulley 62 to rotate upon an axis angularly disposed with respect to the axis of the shaft 67.

Washers 85 may be arranged between the pulley 78 and the bearing portion 36 for adjustment and to reduce friction.

When no drive connection is required the key 77 and the pulley 78 may be omitted.

The film coil 13 is applied to the carrier 12 by arranging the coil on the rollers 33 while the latch devices 34 are opened or in the position shown in dotted lines in Fig. 4, the outside loop of film is then threaded about the guide pulleys 63 and 65 and the rotating element 62 to form the snub loop 61, over the guide pulley 54, the feed sprockets 24 and 25 or through the projector, through a safety switch 91 ordinarily provided to stop the projector in the event of film breakage, over the guide rollers 55, 56 and 57 at the base of the projector and back to the film coil 13.

The latch devices 34 may then be closed manually and the apparatus may be operated in accordance with requirements. The removal of film is obviously a reversal of the above-described operations.

It has been found that good results are obtained when relatively large film coils are to be used if the drive connection between the projector and the rotating element 62 above described is proportioned so that an overdrive of about five per cent is effected, or so that when the film loop 61 is tightly engaged with the periphery of the element 62, film will be pulled from the innermost convolution of the coil 13 slightly faster than it travels through the projector.

When the projector is operated the loop 61 is drawn against the periphery of the element 62 by its inertia until the proper rate of film discharge is attained and any tendency toward overfeeding is eliminated by a reduction of feed in response to any loosening of the snub loop 61 on the periphery of the element 62.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

What I regard as new and desire to secure by Letters Patent is:

1. In combination with a moving picture projector having a projection lens and film feed means for moving film across the axis of the projection lens as an incident to the projection of motion pictures, and an endless film therefor including an annular coil having its ends connected, and forming a separate loop, film guide devices arranged and supported to guide the film of the separate loop about the projector in a film travel plane located parallel to the axis of the projection lens and to the line of movement of the film across the axis thereof, and a carrier for the annular coil of film supported above the projector and provided with means for rotating the annular coil and effecting unwinding thereof from the inside, said carrier being adapted to hold the annular coil perpendicularly with a portion of the periphery thereof intercepting the film travel plane for receiving film as an incident to rotation of the coil and provided with film guiding and control means located within the coil and disposed angularly with respect thereto for directing film spirally back into the film travel plane as an incident to its movement toward the projector, said carrier and guiding means being arranged to dispose said film travel plane in a straight line with respect to the point on the carrier at which the film proceeding from the projector is received, whereby the film may travel in said plane from the point to which it is directed by said guide means to said receiving point on the carrier without twisting.

2. In combination with a moving picture projector having a projection lens and film feed means for moving film across the axis of the projection lens as an incident to the projection of motion pictures, and an endless film therefor including an annular coil having its ends connected and forming a separate loop, film guide devices arranged and supported to guide the film of the separate loop about the projector in a film travel plane located parallel to the axis of the projection lens and to the line of movement of the film across the axis thereof, and a carrier for rotatably supporting the annular coil of film above the projector and to receive film discharged from the projector tangentially and parallel to the film travel plane, said carrier being provided with means disposed angularly with respect to the coil for guiding and delivering film from the innermost convolution of the annular coil substantially spirally into the film travel plane as an incident to movement thereof toward the projector, said carried and guiding means being arranged to dispose said film travel plane in a straight line with respect to the point on the carrier at which the film proceeding from the projector is received, whereby the film may travel in said plane from the point to which it is directed by said guide means to said receiving point on the carrier without twisting.

3. In combination with a moving picture projector having a projection lens and film feed means for moving film across the axis of the projection lens as an incident to the projection of motion pictures, and an endless film therefor including an annular coil having its ends connected and forming a separate loop, film guide devices arranged and supported to guide the film of the separate loop about the projector in a film travel plane located parallel to the axis of the projection lens and to the line of movement of the film across the axis thereof, a carrier for rotatably supporting the annular coil of film in perpendicular relationship above the projector and at an acute angle to the film travel plane with a portion of the periphery thereof intercepting that plane so that film traveling from the projector may be wound thereon directly as an incident to rotation of the annular coil, and angularly disposed means for directing film from the innermost convolution of the annular coil spirally into the film travel plane as an incident to movement of the film toward the projector, said carrier and guiding means being arranged to dispose said film travel plane in a straight line with respect to the point on the carrier at which the film proceeding from the projector is received, whereby the film may travel in said plane from the point to which it is directed by said guide means to said receiving point on the carrier without twisting.

4. In combination with a moving picture projector having a projection lens and film feed means for moving film across the axis of the projection lens as an incident to the projection of motion pictures, and an endless film therefor including an annular coil having its ends connected and forming a separate loop, film guide devices arranged and supported to guide the film of the separate loop about the projector in a film travel plane located parallel to the axis of the projection lens and to the line of movement of the film across the axis thereof, a carrier for rotatably supporting the annular coil of film in perpendicular relationship above the projector and at an acute angle to the film travel plane with a portion of the periphery thereof intercepting that plane so that film traveling from the projector may be wound thereon directly as an incident to rotation of the annular coil, and angularly disposed driven means for effecting rotation of the annular coil and for directing film from the innermost convolution of the annular coil spirally into the film travel plane subject to the application of tension to the film, said carrier and guiding means being arranged to dispose said film travel plane in a straight line with respect to the point on the carrier at which the film proceeding from the projector is received, whereby the film may travel in said plane from the point to which it is directed by said guide means to said receiving point on the carrier without twisting.

5. A film carrier of the type adapted for association with a motion picture projector and for carrying an annular film coil, including a support having a frame plate thereon, a plurality of radially spaced anti-friction rollers attached to said frame plate and adapted to engage the innermost convolution of an annular film coil for rotatably supporting the coil, guide means for controlling the wrapping of the outermost convolutions upon the coil during rotation thereof, a concentrically disposed continuously operable driving element arranged for coordinated operation with a projector, a payout roller connected thereto for rotation therewith and being arranged to rotate about an axis disposed at an acute angle to the axis of rotation of the film coil whereby the film is displaced laterally with respect to the coil as an incident to its travel about the payout roller, and guiding devices arranged adjacent the payout roller for directing the film to and from said roller.

6. A film carrier of the type adapted for association with a motion picture projector and for carrying an annular film coil, including a support having a frame plate thereon, a plurality of radially spaced anti-friction rollers attached to said frame plate and adapted to engage the innermost convolution of an annular film coil for rotatably supporting the coil, a concentrically disposed driving element, a payout roller connected to rotate with said driving element and arranged to rotate about an axis disposed at an angle to the axis of rotation of film coil whereby the film is displaced laterally by the payout roller, and guide means for limiting the arc of engagement between the film and the payout roller.

7. A film carrier of the type adapted for association with a motion picture projector and for carrying an annular film coil, including a support having a frame plate thereon, a plurality of radially spaced anti-friction rollers attached to said frame plate and adapted to engage the innermost convolution of an annular film coil for rotatably supporting the coil, a concentrically disposed driving element, a payout roller connected to rotate with said driving element and arranged to rotate about an axis disposed at an angle to the axis of rotation of film coil whereby the film is displaced laterally by the payout roller, and guide means for limiting the arc of engagement between the film and the payout roller, said driving element being operably connected for actuation by the projector and to drive the periphery of the payout roller at a speed greater than the linear speed of the film through the projector.

8. A film carrier of the type adapted for association with a motion picture projector and for carrying an annular film coil, including a support having a frame plate thereon, a plurality of radially spaced antifriction rollers attached to said frame plate and adapted to engage the innermost convolution of an annular film coil for rotatably supporting the coil, a power operable snub-like payout device rotatably mounted within the innermost convolutions of the film coil and adapted to function in response to tension applied to the outgoing film and in accordance with the extent of the applied tension, said payout device being operably connected for actuation by means of the projector and being mounted with its axis at an angle to the axis of the coil.

9. A film carrier of the type adapted for association with a motion picture projector and for carrying an annular film coil, including a support having a frame plate thereon, a plurality of radially spaced antifriction rollers attached to said frame plate and adapted to engage the innermost convolution of an annular film coil for rotatably supporting the coil, and a continuously operable film discharging means arranged to discharge film from the innermost convolution of the film coil in response to tension applied to the discharged film, said film discharging means being mounted with its axis at an angle to the axis of the coil.

10. A film carrier of the type adapted for association with a motion picture projector and for carrying an annular film coil, including a frame plate, means forming a circular antifriction coil carrier for internally engaging and rotatably supporting the film coil on said plate, and means for pulling out the innermost convolution of the film coil in response to tension applied to the film beyond said means, said means comprising a power operable friction band supported to engage the edges of the film extending angularly from the innermost convolution of the coil at a point located between the inner and outer faces of the film coil, to carry the film without side slippage, and to discharge the film at a point located beyond one of the faces of the film coil.

11. A film carrier of the type adapted for association with a motion picture projector and for carrying an annular film coil, including a support having a frame plate thereon, a plurality of radially spaced antifriction rollers attached to said frame plate and adapted to engage the innermost convolution of an annular film coil for rotatably supporting the coil, centrally disposed means for directing film from the innermost convolution of the annular coil and toward a projector, and yielding means embracing the coil for controlling the registration of the windings thereof, said means comprising, a series of manually movable snap latch devices mounted on said frame plate in radially spaced relationship about the periphery of the film coil and spaced from the frame plate to form therewith an annular channel in which the film coil may rotate, each said device including a pivoted member and a tension spring connected thereto at one side of the axis thereof adapted to hold the same in either open or closed position.

12. A film carrier of the type adapted for association with a motion picture projector and for carrying an annular film coil, including a support having a frame plate thereon, a plurality of radially spaced antifriction rollers attached to said frame plate and adapted to engage the innermost convolution of an annular film coil for rotatably supporting the coil, centrally disposed means for directing film from the innermost convolution of the annular coil and toward a projector, and yielding means embracing the coil for controlling the registration of the windings thereof, said means comprising, a series of pivotally mounted spring actuated gates mounted on the frame plate in radially spaced relationship and spaced from the plate to cooperate therewith in forming a channel in which the film coil may rotate, said gates having outwardly extending handpieces thereon and being manually movable to and yieldingly held in an unobstructed position to permit of substitution of film coils upon occasion.

13. A film carrier of the type adapted for association with a motion picture projector and for carrying an annular film coil, including a support having a frame plate thereon, a plurality of radially spaced anti-friction rollers attached to said frame plate and adapted to engage the innermost convolution of an annular film coil for rotatably supporting the coil, centrally disposed means for directing film from the innermost convolution of the annular coil and toward a projector, and yielding means embracing the coil for controlling the registration of the windings thereof, said means comprising, a series of gates mounted on the frame plate in radially spaced relationship and being pivotally mounted for movement between and yieldingly held in unobstructive and operable positions, said gates being provided with film guiding anti-friction rollers, and a series of anti-friction rollers mounted in the frame plate in opposed film guiding relationship and cooperating with the rollers carried by the gates for limiting lateral displacement of the convolutions of the film coil.

DOLPHUS O. DOLLNIG.